US011546172B2

(12) United States Patent
Haddad

(10) Patent No.: US 11,546,172 B2
(45) Date of Patent: *Jan. 3, 2023

(54) TRANSMISSION, VIA DETERMINATIVE LOGIC, OF ELECTRONIC DOCUMENTS FOR SHARING AND SIGNING ("TESS")

(71) Applicant: Bank of America Corporation, Charlotte, NC (US)

(72) Inventor: Linda Haddad, Concord, CA (US)

(73) Assignee: Bank of America Corporation, Charlotte, NC (US)

( * ) Notice: Subject to any disclaimer, the term of this patent is extended or adjusted under 35 U.S.C. 154(b) by 40 days.

This patent is subject to a terminal disclaimer.

(21) Appl. No.: 17/207,921

(22) Filed: Mar. 22, 2021

(65) Prior Publication Data

US 2021/0211301 A1 Jul. 8, 2021

Related U.S. Application Data

(63) Continuation of application No. 16/400,275, filed on May 1, 2019, now Pat. No. 10,992,479.

(Continued)

(51) Int. Cl.
*G06F 21/40* (2013.01)
*G06F 21/30* (2013.01)
(Continued)

(52) U.S. Cl.
CPC ........ *H04L 9/3247* (2013.01); *G06F 21/6218* (2013.01); *G06F 40/186* (2020.01);
(Continued)

(58) Field of Classification Search
None
See application file for complete search history.

(56) References Cited

U.S. PATENT DOCUMENTS 6,219,423 B1 4/2001 Davis
8,103,867 B2 1/2012 Spitz
(Continued)

FOREIGN PATENT DOCUMENTS

KR 10-2017-0085245 7/2017

OTHER PUBLICATIONS

Delegating signing capability in workflow systems. Fazlagic. IEEE. (Year: 2010).*

(Continued)

*Primary Examiner* — Venkat Perungavoor
(74) *Attorney, Agent, or Firm* — Weiss & Arons LLP

(57) ABSTRACT

Aspects of the disclosure relate to a transmission logic for selecting an authorized signatory as a recipient for an electronic document for signature. The transmission logic forms a part of a communications platform. The platform, including a first electronic communications pathway and a second electronic communications pathway, conducts and supports communication between a first entity and a second entity. The logic may generate an electronic document together with a request for an electronic signature, flag the document and transmit the document along the first electronic communications pathway to an authorized signatory at the second entity. The logic may also select a signatory according to a predetermined protocol, determine the availability of the selected signatory, confirm the selection, and transmit the electronic document to the authorized signatory for signature. Upon notification of the electronic signature, the logic may transmit, along the second pathway, the document to the first entity.

5 Claims, 8 Drawing Sheets

Related U.S. Application Data

(60) Provisional application No. 62/754,639, filed on Nov. 2, 2018.

(51) Int. Cl.
*G06F 21/62* (2013.01)
*H04L 9/32* (2006.01)
*H04L 9/14* (2006.01)
*H04L 9/40* (2022.01)
*G06F 40/186* (2020.01)

(52) U.S. Cl.
CPC .............. *H04L 9/14* (2013.01); *H04L 9/3255* (2013.01); *H04L 63/101* (2013.01)

(56) References Cited

U.S. PATENT DOCUMENTS

| | | | |
|---|---|---|---|
| 8,132,261 | B1 | 3/2012 | Simpson et al. |
| 8,484,723 | B2 | 7/2013 | Oswalt |
| 8,819,813 | B2 | 8/2014 | Oswalt |
| 8,874,923 | B2 | 10/2014 | Foygel |
| 9,178,707 | B2 | 11/2015 | Foygel |
| 9,313,032 | B2 | 4/2016 | Oswalt |
| 9,325,508 | B2 | 4/2016 | Oswalt |
| 9,350,554 | B2 | 5/2016 | Oswalt |
| 9,350,555 | B2 | 5/2016 | Oswalt |
| 9,594,739 | B2 | 3/2017 | Dunn et al. |
| 9,634,975 | B2 | 4/2017 | McCabe et al. |
| 9,853,818 | B2 | 12/2017 | Oswalt |
| 9,882,725 | B2 | 1/2018 | Foygel |
| 9,984,242 | B2 | 5/2018 | Follis |
| 10,032,133 | B2 * | 7/2018 | Follis .................. G06F 21/6209 |
| 10,091,003 | B2 * | 10/2018 | Bhandarkar .......... H04L 9/3247 |
| 10,110,385 | B1 * | 10/2018 | Rush ..................... H04L 9/3234 |
| 10,992,479 | B2 * | 4/2021 | Haddad ................. H04L 63/101 |
| 2002/0048372 | A1 * | 4/2002 | Toh ....................... H04L 9/3297 713/180 |
| 2003/0078880 | A1 | 4/2003 | Alley et al. |
| 2006/0184865 | A1 * | 8/2006 | Chakraborty .......... G06Q 10/10 715/752 |
| 2008/0235577 | A1 * | 9/2008 | Veluchamy .......... G06F 21/6209 715/268 |
| 2011/0296191 | A1 | 12/2011 | Mouille |
| 2012/0303962 | A1 | 11/2012 | Ghani et al. |
| 2013/0212038 | A1 * | 8/2013 | Marko .................. G06F 21/645 705/342 |
| 2014/0304512 | A1 | 10/2014 | Kotov et al. |
| 2019/0121846 | A1 | 4/2019 | Kim et al. |
| 2019/0319948 | A1 * | 10/2019 | Triola ................... H04L 9/3218 |
| 2021/0029135 | A1 * | 1/2021 | Kurian .................. H04L 63/123 |
| 2021/0211301 | A1 * | 7/2021 | Haddad ................. H04L 9/3247 |

OTHER PUBLICATIONS

Design of a Secure Fine-Grained Official Document Exchange Model for E-Government. Chen. Information & Security. (Year: 2004).*
Multiple Signature Handling in Workflow Systems. Leung. IEEE. (Year: 2000).*
XML Security Model for Secure Information Exchange in E-Commerce. Cho. Springer-Verlag.(Year: 2006).*
Leiba et al., "DomainKeys Identified Mail (DKIM): Using Digital Signatures for Domain Verification.," CEAS (Year: 2007).
Leung et al. "Handling Signature Purposes in Workflow Systems," Elsevier. (Year: 2001).
Rahmawati et al., "Digital Signature on File Using Biometric Fingerprint With Fingerprint Sensor on Smartphone," IEEE. (Year: 2017).
Yiu, "Sharing and Access Right Delegation For Confidential Documents: A Practical Solution," Elsevier. (Year: 2006).
Unverified Machine Translation of KR20170085245, Generated by Patent Translate Powered by EPO and Google. (Year: 2017).

* cited by examiner

Checklist for using your T.E.S.S. account with Cooperating Entity for Treasury documents

Requirements to submit documents using T.E.S.S. ─ 102

☐ An Active T.E.S.S. account

☐ Documents and letters of instruction must be for US accounts and/or US relationships ☐ Set up each of your known signer profiles to include name, title, and uploaded image of signature specimen ☐ Work with Cooperating Entity contact to effect a test message

Preparing the document for delivery to Cooperating Entity ─ 104

☐ Prepare your documents or letters, load to T.E.S.S., and add field tags for your signer(s)

☐ From the Actions Dropdown list within T.E.S.S., add Cooperating Entity as a CC Receives a Copy recipient ☐ Select Set Signing Order to ensure your document is only delivered to Cooperating Entity after fully executed by selected signatory ☐ Make Cooperating Entity last in the order, and use your dedicated Cooperating Entity group mailbox email address for delivery. Ask your Cooperating Entity representative if you are unsure of this address ☑ Set signing order

| 1 or | Auto-Selected Recipient | ✓ NEEDS TO SIGN ▽ MORE ▽ |
| 2 and | Authorized Signer<br>Signer@company.com | ✓ NEEDS TO SIGN ▽ MORE ▽ |
| 3 | Cooperating Entity<br>Dedicatedmwtwo@ce.com | CC RECEIVES A COPY ▽ MORE ▽ |

☐ From the Actions Dropdown list within T.E.S.S., use Edit Message to add your company name and T.E.S.S. envelope ID to subject line on each request; [[SenderCompany]], [[Envelope ID]] then send your documents. Cooperating Entity will receive the final executed copy directly from T.E.S.S., saving you the added step of saving and attaching to an email.

Message to All Recipients ─ 106

☐ Custom email and language for recipient

[[SenderCompany]] [[EnvelopeID]], Please review

Documents for Electronic Signature

FIG. 1

TRANSMISSION, VIA DETERMINATIVE LOGIC, OF ELECTRONIC DOCUMENTS FOR SHARING AND SIGNING ("TESS")

CROSS REFERENCE TO RELATED APPLICATION

This application is a continuation of U.S. patent application Ser. No. 16/400,275 filed on May 1, 2019 and entitled TRANSMISSION, VIA DETERMINITIVE LOGIC OF ELECTRONIC DOCUMENTS FOR SHARING AND SIGNING ("TESS") which is hereby incorporated by reference herein in its entirety.

FIELD OF TECHNOLOGY

Aspects of the disclosure relate to electronic document sharing and signing. Specifically, aspects of the disclosure relate to electronic document sharing and signing with a heretofore unknown recipient. For the purposes of this application, the term "document" or "document(s)" referred to herein should be understood to refer to electronic documents. The terms "sharing" and "signing" referred to herein refer to the electronic sharing and electronic signing of electronic documents.

BACKGROUND OF THE DISCLOSURE

Corporate entities have a need to exchange documents and agreements with each other. In some situations, two cooperating entities do not necessarily know each other's signatory requirements or internal policies regarding same. In other situations, two cooperating entities may know each other's signatory requirements or internal policies regarding same. In yet other situations, one of two cooperating entities may know the other's signatory requirements or internal policies. In conventional systems, these entities have to manually share expectations regarding sharing and saving e-documents and hope the other party follows their respective rules.

Often a corporate entity faces difficulties with a document signature system. For example, maintaining an authorized signer database (for the purposes of this application the terms "signer" and "signatory" are interchangeable and refer to the one signing and/or affixing his or her electronic signature to the electronic document) can be difficult and may take long periods of time to update. A corporate entity's workflow is neither connected nor necessarily aligned with other entities—even with entities with which the corporate entity is cooperating. Such a non-aligned workflow may be non-aligned because of dual signer policies, limits associated with certain signers, etc.

In addition, a cooperating entity may be responsible for maintaining corporate-entity-client authorized signer lists but clients do not always let the cooperating entity know about changes to such lists (or to the contents of the lists in general.) And, as mentioned above, there may be workflow divergence between a corporate entity and a cooperating entity. For example, a corporate entity may require a change put through the system immediately, but the cooperating entity may be working on multiple-day service level agreement. As such, the cooperating entity may only be scheduled, and/or expected, to put through such a change over a multiple-day interval instead of immediately. Finally, the available signatories at any given time, or across a window of time, may not be known even to the corporate entity. As such, obtaining authorized signatures on certain documents that are sent to an unavailable signer may be delayed.

Typically, corporate entities need to control the individuals authorized to sign on behalf of the entity. Corporate entities also want to be able to access, and, when necessary, change their list of authorized signers. In addition, corporate entities need to be able to require that signers conform to internal policy and directives. Also—corporate entities often demand additional visibility into status of submitted documentation related to requests.

Counterpart entities (referred to herein in the alternative as "cooperating entities") to the corporate entities may be recipients of electronically-signed documents from, or may exchange electronically-signed documents with, the corporate entity. Such counterparts may also have various needs related to document sharing and signing.

Under certain circumstances, corporate entities may want to maintain a dynamic roster of authorized signers. Under such circumstances, all, or some, members of the list of authorized signers may be unknown to cooperating entities such as entities who are attempting to exchange electronic documentation with the corporate entity for signature by the authorized signatories of the corporate entity.

Also, the corporate entity typically, to the extent possible, wants to maintain the confidentiality of its signers.

Accordingly, it would be desirable to provide systems and methods for transmission, via determinative logic, of electronic documents for signing and sharing (TES S).

SUMMARY OF THE DISCLOSURE

Aspects of the disclosure relate to transmission, via determinative logic, of electronic documents for signing and sharing (TESS). TESS may be implemented via a platform for communication between a first entity and a second entity. TESS may be implemented via logic resident at an entity that receives, for authorized signature, an electronic document. TESS may be implemented in response to receipt of a request for an electronic document and signature thereon. TESS may be implemented, in one alternative embodiment, on the transmitter-side of a request for signature on an electronic document.

An aspect of the disclosure may include a method for receiving and routing an agnostic request for electronic signature on an electronic document. The request may require an electronic signature by an authorized signatory. The method may include selecting, using transmission logic, an authorized signatory. The selection may be from among a plurality of authorized signatories. The selection may be for transmission thereto, of an electronic document for electronic signature by the selected authorized signatory. The transmission logic may form a part of a communication system located at a first entity. The communication system may be in line with a communication platform.

The communication system may include a first electronic pathway. The communication system may include a second electronic pathway. The communication platform may be for communicating between the first entity and a second entity. The second entity may be associated with the generation of the preferably agnostic request.

The transmission logic may be configured to receive the electronic document along the first electronic pathway. The transmission logic may be further configured to access a list of the plurality of authorized signatories. The transmission logic may also be configured to determine the availability of an authorized signatory from among a list of the plurality of authorized signatories. The determining may be effected according to a predetermined protocol.

When the authorized signatory is determined to be available, the method may include selecting the authorized signatory from among the list of plurality of authorized signatories. The method may also include transmitting the electronic document to the authorized signatory for affixing the electronic signature to the electronic document. The method may further include, upon notification of the affixing of the electronic signature to the electronic document, transmitting, along the second electronic pathway, the electronically signed electronic document to the second entity.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 1 shows an illustrative checklist in accordance with principles of the disclosure;

DETAILED DESCRIPTION OF THE DISCLOSURE

Figure 2A:
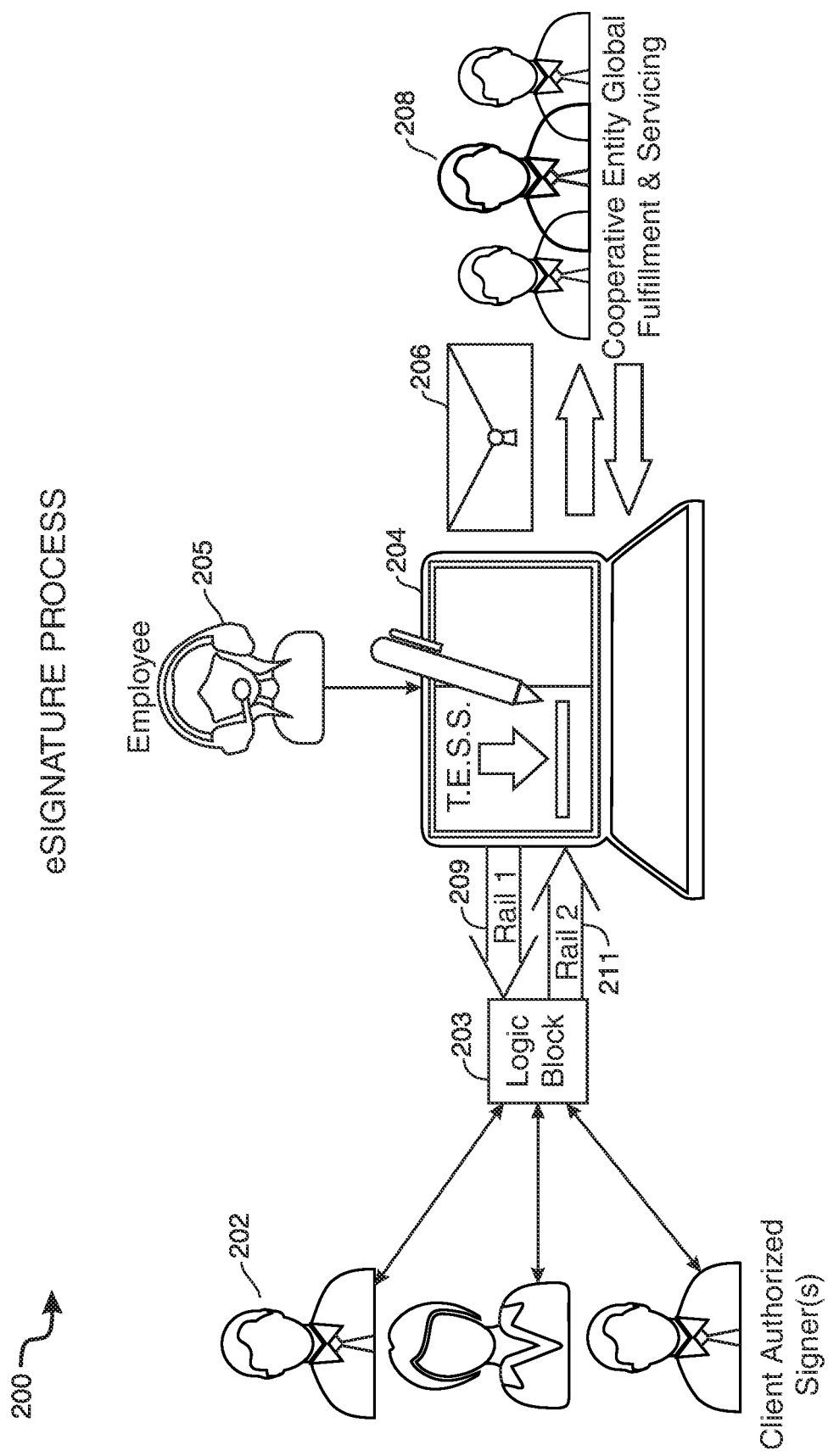
FIG. 2A-2C show schematic illustrations of a hybrid method/system in accordance with principles of the disclosure.

Conventional electronic systems for processing documents for obtaining electronic signatures utilize standard databases. One database resides at the corporate entity together with the authorized signatories. One database resides at the cooperating entity tasked with obtaining the signatures from one or more of the authorized signatories.

Typically, the conventional electronic systems only possessed the ability to route to known authorized signatories. However, such routing to known authorized signatories required that the visible/and/authorized signatories be visible to participants in the communication chain along the communication pathway. In fact, the identity of such visible/and/authorized signatories are, by definition, open and available to each participant along the transmission path.

This conventional process involves two challenges. First, it requires that participants at the electronic document-generating entity identify an authorized signatory. Such identification requires that the participants at the electronic document-generating entity also contact the authorized signatory to determine availability of the identified authorized signatory. In short, whether the electronic document originated at the corporate entity or at a cooperating entity, the conventional systems required that both entities needed to know the identity of the authorized signer prior to processing the electronic document for signing.

This added layer of identification, and subsequent contact, requires additional resources—both computer resources in the case of electronic correspondence and scheduling regarding same, and human resources required to make the contact and confirm availability.

Second, the process exposes the identity of one or more of the authorized signatories to the electronic document-generating entity. This may compromise the security of the identities of the authorized signatories by unnecessarily exposing their identities to members of the electronic document-generating entity as well as to unqualified employees of the entity at which the authorized signatories are located. This may also require, in certain circumstances, substantially continuously synching the database of the electronic document-generating entity and the database of the entity at which the signatories reside. This synching is required because the electronic document-generating entity requires up-to-date information regarding the identity of the authorized signatories.

In some circumstances, such as one in which an electronic-document receiving employee is only of temporary status, it may not be desirable for the corporate entity to expose identification of visible/and/authorized signatories to temporary or other workers within the entity itself.

In some embodiments, system logic may route the electronic document from the electronic document-generating entity to the entity at which the authorized signatories reside. At the entity at which the authorized signatories reside, the document may be identified, categorized and then transmitted to one or more of the authorized signatories.

In other embodiments, even at the incoming point of the entity at which the authorized signatories reside, the identity of the authorized signatory may remain hidden. Such embodiments may preferably utilize a flag, or other indicator, that an authorized signatory is required. However, the identities of the list of authorized signatories in such embodiments would preferably remain hidden and/or masked from the originator of the request. Although the authorized signatory will become known once the executed document is returned to the originator, these embodiments preferably maintain security of the list of authorized signatories to a relatively higher level than previously considered.

These embodiments may maintain secrecy of the authorized signatory even within the entity at which the authorized signatory resides. In some embodiments, the identity of the authorized signatory may not be known on the outgoing document as well. The identity of the authorized signatory may, in such embodiments, be maintained in secrecy until the document arrives at the document generator and/or requestor. Such an embodiment could, in certain circumstances such as when the two parties agree, effectively switch responsibility for confirming the authorization of the identity of the authorized signatory to the corporate entity to ensure at which the signatory resides.

Accordingly, a temporary worker at the corporate entity could receive the document and send it along for routing by a routing web to an authorized signatory without knowing the list of authorized signatories.

In certain such embodiments, the corporate entity itself would not know the list. Rather only certain, select, representatives within the corporate entity would know the list of authorized signatories.

It should be noted that some embodiments may involve a different routing rail—i.e., electronic transmission pathway—for incoming transmissions and a different routing rail for outgoing transmissions. Accordingly, such embodiments may enable, along a first rail, receipt of an incoming transmission of an electronic document in need of signature that does not specify an authorized signatory. Such embodiments may include logic for routing the incoming transmission to a predetermined signatory according to a predetermined protocol.

Such embodiments may also enable an outgoing transmission. Such an outgoing transmission may specify involve a different routing rail out of the corporate entity for the signed electronic document. In such cases the incoming rail might indicate that the document was sent to a to-be-determined authorized signatory. The outgoing rail may indicate that the signed document be executed by a different rail, with a known authorized signatory.

It should be noted that a record of authorized signatories internal to the corporate entity could be handled by only an appropriate, and preferably pre-determined, level of entitlements—i.e., employees associated with a pre-determined level of clearance within an entity, preferably along a first rail. In this architecture—the access to signatories could be controlled according to the level of the entitlement of the actor involved with the incoming documents. The access to outgoing documents could also be controlled by a second level of entitlement.

In short, the first rail may specify a first level of entitlements—for processing raw incoming electronic transmissions. The raw incoming electronic transmissions preferably does not specify an authorized signatory. In certain embodiments, the first level of entitlements may have access to an internal list of signatories. In some embodiments, the first level of entitlements have no access to the internal list of signatories.

An extension of rail 1 may specify a second level of entitlement and preferably provide for routing the raw incoming electronic transmissions to an authorized signatory (either user-defined, or system-set.) The authorized signatory could then affix an electronic signature.

Rail 2 may be for outgoing transmission of signed electronic documents. Such use may also specify a second level of entitlement. The second level of entitlement may involve employees that are entitled to access and/or have knowledge of the identities of authorized signatories.

The systems and methods according to the system preferably involve architecture with logic. The logic preferably saves time for determining and contacting authorized signatory. One reason that such systems and methods conserve resources is that the cooperating entity is not required to possess the database including the authorized signatories. In such circumstances, the cooperating entity also does not have to resort to other entities in order to access information regarding the authorized signatories. Preferably, the corporate entity may maintain the database of authorized signatories.

In certain embodiments of the invention, the authorized signatories database could be made available on an internal, preferably restricted, e-mail, web or other electronic system. Further, access to one more of a plurality of authorized signatories could be determined by determinative logic.

In some embodiments, documents may be categorized according to one or more document types. Such document types may be directed by the logic to different lists according to different categories and/or levels of entitlements associated with the categories. For example, a request for signatories relating to an "opening accounts" document may retrieve one list of authorized signatories, and a request for signatories relating to an "adding services" could retrieve a second list of authorized signatories.

In preferred embodiments, the logic may be adjustable with respect to the identification of the recipient of the document. For example, the logic should preferably create a new drop down menu for the corporate side. The drop down menu may preferably enable the corporate side to have the option of manually and/or automatically routing the electronic document for signature.

In certain embodiments, an API resident at the corporate entity, or in any other suitable location, may preferably enable a user, or the system, to conform the electronically-signed document to the provided electronic document requirements among other things.

Such conforming may involve the following configuration issues. For example, the API may configure the following aspects of the electronically-signed document to the provided electronic document:
1) Signer Definition
2) Document Categories;
3) System-Setting Parameters;
   a) cc copy to a dedicated mailbox
   b) subject-line information; and/or
   c) other suitable configuration items; and
4) Varying cooperating entities might specify different configurations.

Often, the foregoing configuration issues relating to the various cooperating issues involve common terminology/definition/mapping of fields. Attention to these issues may consume additional resources. Such additional resources may be drawn from the originator of the electronic document.

A transmission logic for selecting an authorized signatory from among a plurality of authorized signatories is provided. The transmission logic may enable transmission of an electronic document for electronic signature by the selected authorized signatory. The transmission logic may form a part of a communication system located at a first entity. The communication system may be part of an architecture that includes a communication platform. The communication system may be in line with the communication platform. The communication system may include a first electronic pathway and a second electronic pathway. The communication platform may enable communication between the first entity and a second entity.

The transmission logic may be configured to receive, from along the first electronic pathway, the electronic document together with a request for signature by one of a group of authorized signatories. The transmission logic may also be configured to access a list of the plurality of authorized signatories.

The transmission logic may be configured to determine the availability of an authorized signatory from among the list of the plurality of authorized signatories. The determining may be effected according to a predetermined protocol. Such a protocol may involve an algorithm based on various factors. Such factors may include availability of the signatory, level of entitlement of the signatory, categorization of the electronic document and/or any other suitable factor associated with the selection of the signatory.

When the authorized signatory is determined to be available, the logic may proceed to select the authorized signatory from among the list of plurality of authorized signatories. Following selection of the authorized signatory, the logic may instruct the system to transmit the electronic document to the authorized signatory for affixing, or otherwise electronically signing, the electronic signature to the electronic document.

Upon notification of the affixing of the electronic signature to the electronic document, the logic may instruct the system to transmit, preferably, but not necessarily, along the second electronic pathway, the electronically-signed electronic document to the second entity.

In certain embodiments, the electronic document may include an electronic signature applied by a signatory to a location on each of the documents that corresponds to a predetermined and preferably embedded field tab.

In some embodiments, the protocol may include a ranking of authorized signatories defined by one or more predetermined metrics. The predetermined metrics may include, for example, the level of availability of the authorized signatories. The protocol may also include a ranking of authorized signatories defined by two or more predetermined metrics. The two or more of the predetermined metrics may include the level of availability of the authorized signatories and the seniority or level of entitlement of the authorized signatories. When the protocol determines that a selected signatory is not available for electronic signature, the protocol may require signature by two or more authorized signatories on the electronic document.

Specifics of a shared ecosystem according to certain embodiments follow. The embodiments are described in conjunction with FIGS. 1-3.

FIG. 1 shows a preferably client-initiated eSignature checklist 100 for use with certain embodiments. In certain embodiments, such a checklist may be complemented by an API. The API preferably enables clients to auto-adjust their respective TESS account settings and template for sending electronic documents to a cooperative entity. It should be noted that, while FIG. 1 shows a preferably client-initiated eSignature checklist 100 for use with certain embodiments, the same or other embodiments may involve a similar checklist for use at the cooperating entity side of the API. Such a cooperating entity-initiated eSignature checklist may be used to allow the cooperating entity to generate the e-signature checklist.

A corporate client may be provided with such a checklist, as shown in FIG. 1. The checklist preferably outlines the actions a corporate client takes in order to initiate a signed-document transmission to, or exchange with, a cooperative entity. Such actions enable the corporate entity to participate in a TESS ecosystem as set forth herein.

The client-initiated eSignature checklist 100 preferably includes at least two sections—1) Requirements to submit using a TESS 102 and 2) Preparing documents for delivery to the cooperative entity 104. The client-initiated eSignature checklist 100 may, in certain embodiments, further include a message to all recipients 106.

Requirements to submit using a TESS 102 preferably detail that a user needs an active TESS account; documents and letters of instruction for United States (US) accounts and/or US relationships; and details of known signer profiles such as name title, and uploaded image of signature specimen for known signatures, and the ability to work with a cooperating entity to effect a test message.

To the extent that not all signatories should be available to all employees of the client entity, more some, or all of the signatories may be available in this checklist, or in a document dropdown associated therewith. In the absence of known signatories, the system may enable a user to submit the document without identifying a known signatory and have the system route the document according to the predetermined protocol. In certain embodiments, such submission may preferably be routed along a first communication rail, as described in more detail above.

Preparing documents for delivery to the cooperative entity 104 may include the following instructions. The instructions may include preparing documents or letters, loading such letters to TESS, and adding field tags for signers. Field tags for signers can be specified in one of two ways: 1) Passing the explicit x/y coordinates of each tab in the xml when creating the Envelope. This is appropriate for documents with a standard format, where the signature lines and/or other data items collected by the tabs are always located in the same place on the document. In this scenario, the xml request describes where to locate the tabs. 2) Specifying "anchor" strings that exist in the document, against which the tabs should be placed. This is appropriate for documents that have variable content/format, where the tab locations must similarly vary. In this scenario, the xml request describes how to locate such tabs.

In addition, the instructions may include the ability to edit recipients to add a cooperative entity as a "cc receives a copy" recipient. Also, the instructions may include selecting a "set signing order" to ensure the document is only delivered to a cooperative entity after signatories have been determined, located and the document has been fully executed. Finally, the instructions may include directing the cooperative entity to be the last address in the order, and using a dedicated cooperative entity group e-mail address for delivery. In certain embodiments, the cooperative entity side logic may be invoked to route the electronic document for signature according to a pre-determined protocol. In some embodiments, the cooperative entity side logic may be invoked to route the received electronic document to a predetermined recipient at the cooperating entity.

In certain embodiments, the instructions may further direct the user to use "Edit Message" to add to the company name and TESS envelope ID to configure the subject line of each request, and then to send the document. The cooperative entity may then receive the final executed copy directly from TESS, saving the added step of saving the document and attaching it to the e-mail for transmission to the cooperative entity.

Figure 2B:
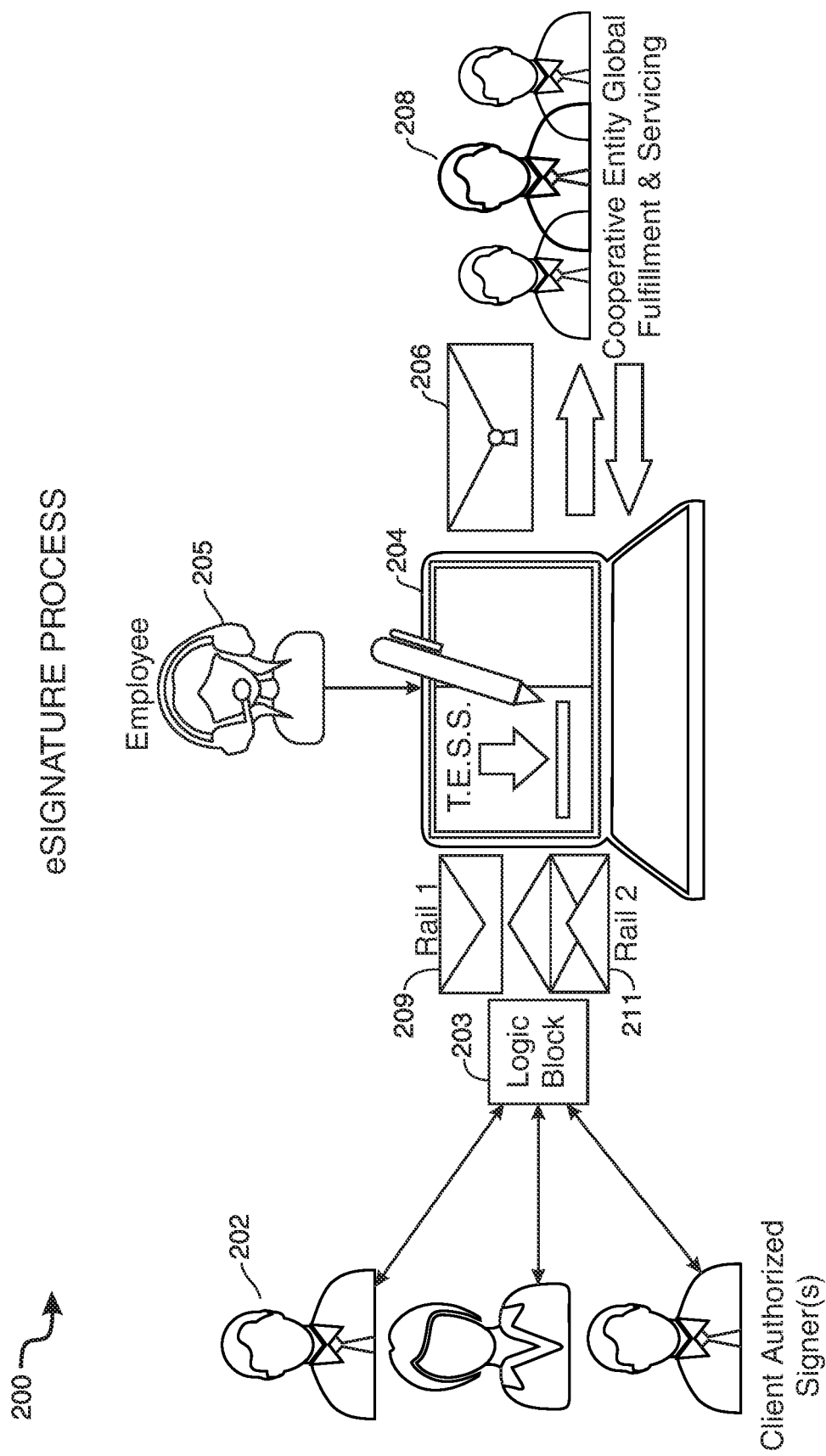
Figure 2C:
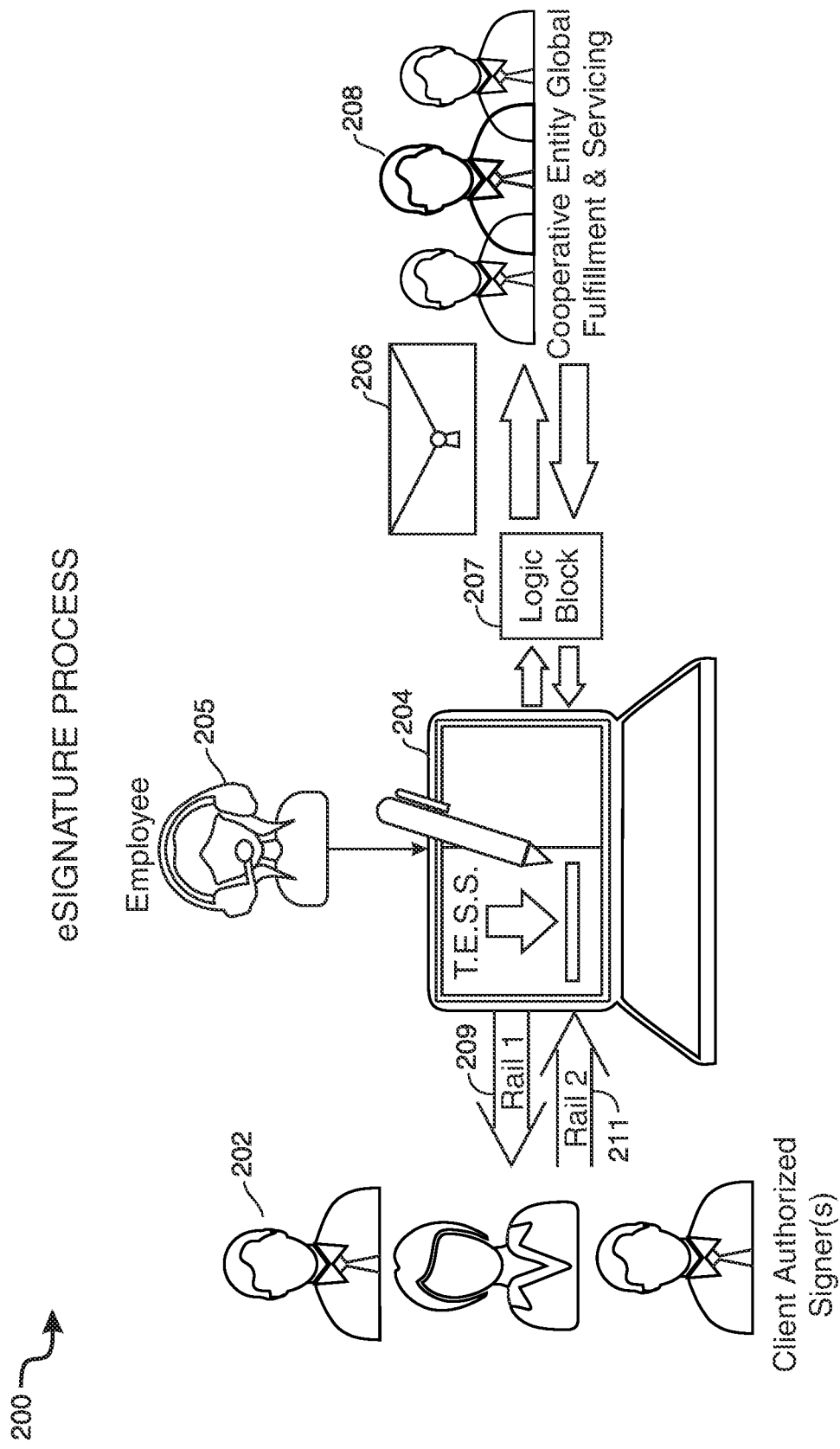

FIGS. 2A-2C shows preferably client-initiated e-signature processes 200. One or more client-based, authorized, signatories 202 are shown. It should be noted that while signatories 202 are authorized, they still require authentication at the time of applying their signatures. Thus, in order to electronically sign a document, a signatory 202 must preferably authenticate his identity to the system. Such authentication may involve using one or more password(s), biometric authentication, a combination of two or more of the foregoing, or any other suitable authentication.

TESS 204 may preferably host the checklist shown in FIG. 1 (above) The TESS 204 may preferably include the list of authorized signers shown at 202. Thereafter, electronically signed documents 206 may preferably be received by, and/or exchanged with, the cooperative entity at 208.

FIG. 2A shows that an e-signature process may be initiated by a client-entity-side employee 202. Such an employee may initiate the process shown in FIG. 2A by completing the checklist shown in FIG. 1. Upon completion of the checklist, the process shown in FIG. 2A may preferably transmit an electronic document 206, once signed from one of the employees to the logic block 203. Thereafter, the routing of the electronic document 206 may be completed, via TESS 204, to cooperating entity 208.

FIG. 2B shows that an e-signature process may be initiated by a corporate-entity-side employee 208. Such an employee 208 may initiate the process, but preferably without making contact, or, in some embodiments, even identifying a client side employee 202. In such embodiments, logic block 203 may preferably route electronic document 206 to an appropriate and preferably authorized signer. The routing may be controlled by a predetermined protocol. Following identification and selection of an authorized signatory, logic block may preferably route the unsigned electronic document to the appropriate authorized signatory.

FIG. 2C shows a cooperating-entity-side logic block 205. Such a logic block 205 may preferably perform the same or different functions than logic block 203. In certain embodiments, where logic block 205 is performing different functions from logic block 203 and the same functions, logic block 205 may preferably be used to perform routing functions, as necessary, at the cooperating entity 208, and/or route the electronic document to an identified authorized signatory at the client entity 204. Logic block 205 may also preferably route the electronic document, once executed, to an appropriate location within the cooperating entity 208.

Figure 3A:
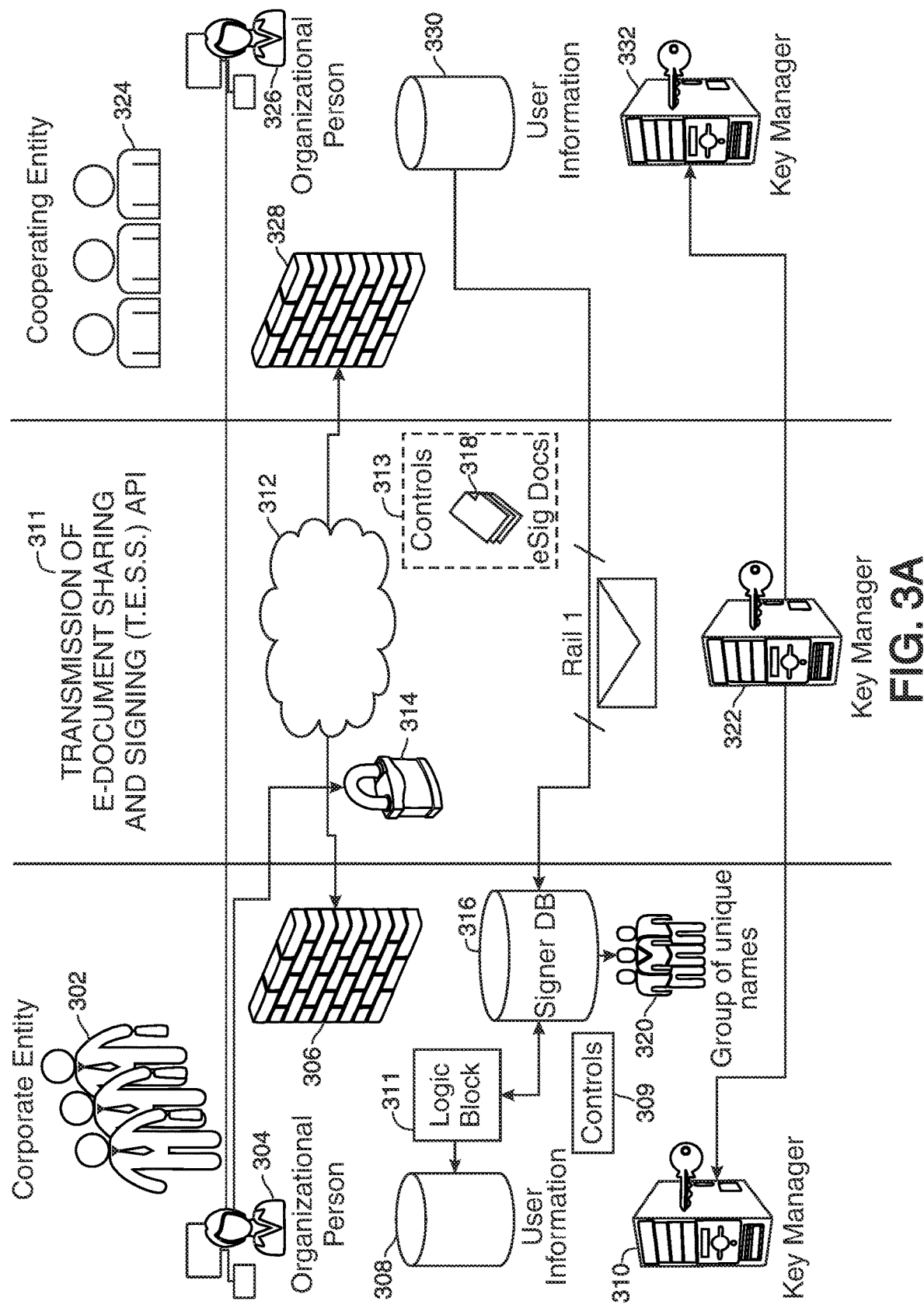
FIG. 3A-3C show schematic illustrations of transmission, via determinative logic, of electronic documents for sharing and signing ("TESS") in accordance with principles of the disclosure.
Figure 3B:
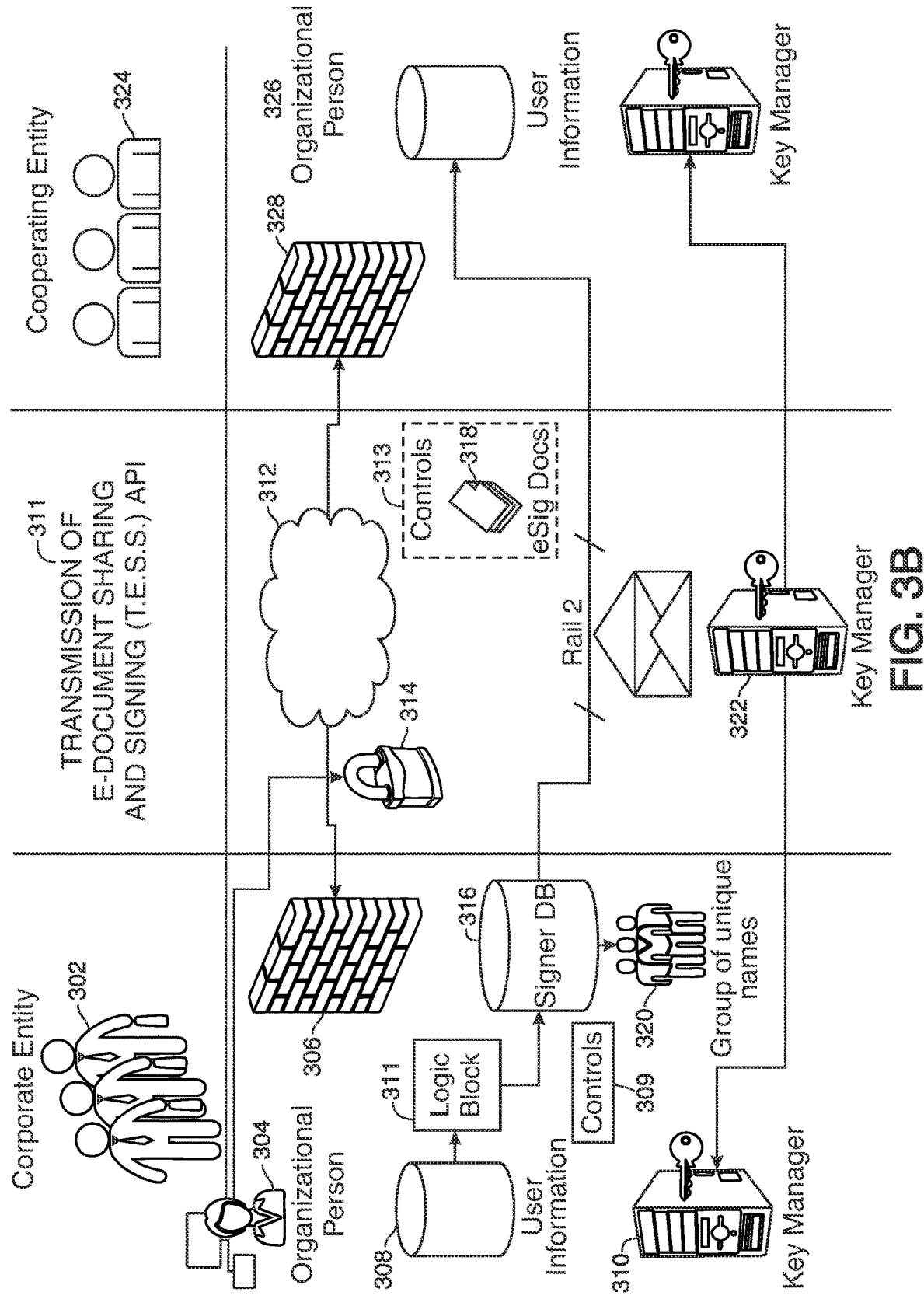
Figure 3C:
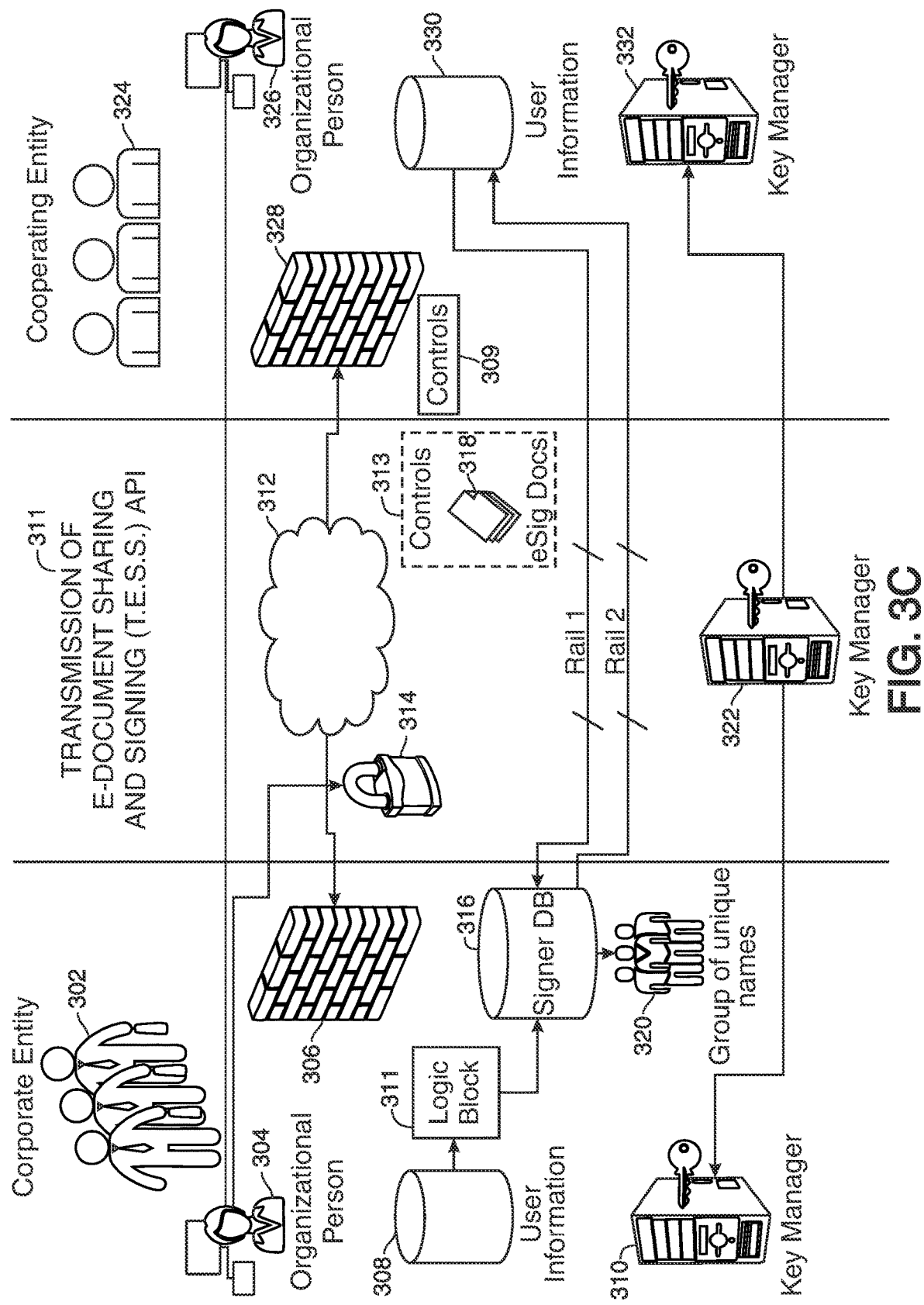

FIG. 3A-3C show illustrative embodiments of an architecture according to certain principles of the disclosure. The corporate entity is shown at 302. A cooperating entity is shown at 324. FIG. 3A resembles the schematic illustration shown in FIG. 2A to the extent that in both FIGS. 2A and 3A, the client entity side initiates the transaction. FIG. 3B resembles the schematic illustration shown in FIG. 2B to the extent that the cooperating entity side initiates the transaction. FIG. 3C resembles the schematic illustration shown in FIG. 2C to the extent that the logic block has been moved to the cooperating entity. It should be noted that, in certain embodiments, a logic block may disposed both at the client entity as well as the cooperating entity.

Corporate entity 302 may include an organizational person 304. Corporate entity 302 may also include firewall 306. Corporate entity 302 may also include user information 308 and a key manager 310. User information 308 may include controls 309. Corporate entity 302 may also include a signer database 316. Signer database 316 may preferably be deployed in communication with logic block 311. It should be noted that in FIGS. 3A-3C signer database 316 is preferably located and protected within corporate entity 302.

TESS may, in certain embodiments also include controls 313 provided by the business.

Organizational person 304 may preferably be a corporate entity assignee responsible for directing and/or arranging the electronic signing and sharing.

Firewall 306 may preferably protect corporate entity 302 from any malware or other damaging information being transmitted through cloud 312.

TESS 311 may access cloud 312. Organizational person 304 may also control a lock 314 located in TESS. Lock 314 may preferably govern access from corporate entity 302 to cloud 312. It should be noted that, in certain embodiments, TESS may take the form of, or include, an Application Program Interface (API).

Authorized signers 320 are shown schematically. Electronically-signable documents are shown schematically at 318. Accordingly, one of the authorized signers 202 or other employee 205 of the client entity may preferably leverage TESS 204 to initiate an e-signature process according to some embodiments, as shown schematically in, inter alia, FIG. 2A. Such an e-signature process may be initiated, by company employee 205 or other suitable initiator, independent of knowledge of which client-entity employee will execute the document.

At FIG. 2B, the logic block 203 is shown as located between TESS and client-side authorized signers 202. Logic block 203 may preferably determine, according to a pre-determined protocol, the client-side authorized signer for signing the electronic document. The electronic document 206 may be self-generated from within client entity 202. In some embodiments, electronic document 206 may be received from cooperating entity 208. Electronic document 206 may preferably be shown as transmitted received from or transmitted to (following signature) to cooperating entity 208.

It should be noted that FIGS. 2A-2C show first rail 209 and second rail 211. In certain embodiments, an electronic document 206 received from cooperating entity 208 absent specification of an authorized signatory may be received at client entity 202 via first rail 209. Following execution, electronic document 206 may be transmitted back to cooperating entity 208, via logic block 203 and routed across second rail 211.

In some embodiments, a self-generated electronic document 206 received from within client entity 202 absent specification of an authorized signatory may be sent and routed through logic block 203. Following execution, electronic document 206 may be transmitted back to cooperating entity 208, via logic block 203 and routed across second rail 211.

Signer database 316 may include one of several configurations. For example, in certain embodiments, signer database 316 may be read from or written to by selected members of entity 302. In certain embodiments, access to database 316 may preferably be controlled. Such control may include enabling access to pre-determined levels of entitlements. Such access may, in certain embodiments be limited to one or more preferably pre-determined communication rails.

In some embodiments, signer database 316 may be read from or written to by entity 302 and only read from by entity 324. In such embodiments, entity 302 may preferably entrust entity 324 with knowledge of its signer database 316, but maintain complete control of the contents and authorizations of signer database 316.

Such a configuration—i.e., wherein database 316 may be read from or written to by entity 302 and only read from by entity 324 (and even, in certain embodiments, masked and/or hidden in whole or in part from cooperating entity 324)— may enable the transmission of electronically signed documents 318 from entity 302 to entity 324. In certain embodiments, entity 302 may bear the responsibility of verifying the propriety of the electronic signatures—using access to database 316.

It should be noted further that preferably all of the embodiments disclosed herein require that each of entity 302 and entity 324 are accessible only by a suitable software key. Such software keys may be in the possession of key managers shown schematically at 310, 322 and 332.

Figure 4:
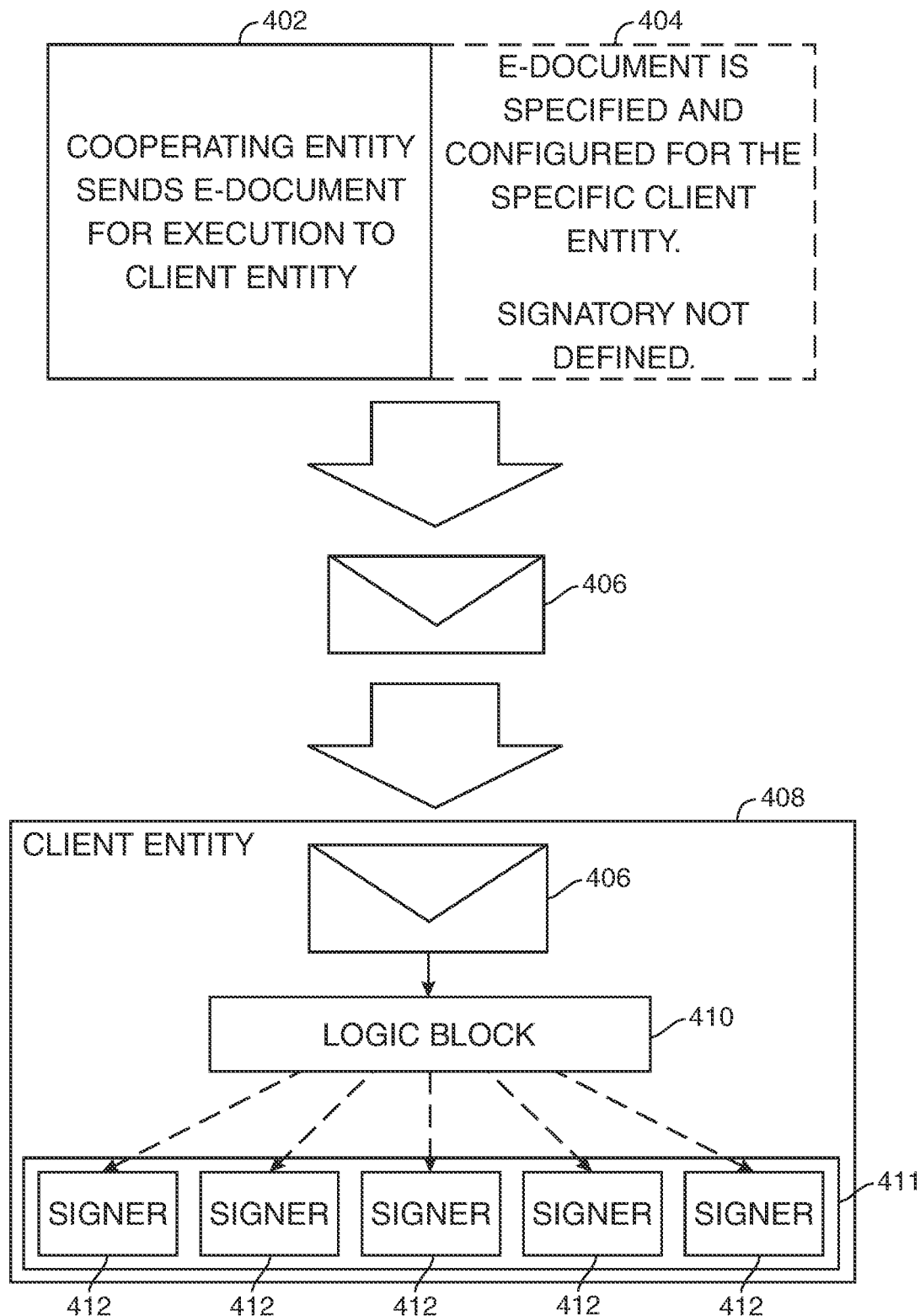
FIG. 4 shows another schematic illustration of transmission, via determinative logic, of electronic documents for sharing and signing ("TESS") in accordance with principles of the disclosure.

FIG. 4 shows another schematic illustration of transmission, via determinative logic, of one or more electronic documents 406 for sharing and signing ("TESS") in accordance with principles of the disclosure. At 402, FIG. 4 shows a cooperating entity sending an e-document for execution to a client entity. As part of the transmission, the cooperating entity specifies the e-document and configures the e-document to the specifications of the client entity. In some embodiments, no signatory is defined in the transmission.

The client entity is shown at 408. At client entity 408, the identification of signers is stored in database 411. Upon receipt, e-document 406 is preferably transferred to logic 410. Block 410 preferably selects one or more of signers 412 for transmission to, and signature or, e-document 406.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for transmission, via determinative logic, of electronic documents for sharing and signing ("TESS") are provided. Persons skilled in the art will appreciate that the present invention can be practiced by other than the described embodiments, which are presented for purposes of illustration rather than of limitation, and that the present invention is limited only by the claims that follow.

What is claimed is:

1. A system for routing an electronic document to an unidentified authorized signatory, the system comprising a communication system located at a first entity, said communication system being in line with a communication platform, said communication system comprising a first electronic pathway associated with a first level of entitlement and a second electronic pathway associated with a second level of entitlement, said communication platform for communicating between the first entity and a second entity, said communication system comprising transmission logic configured to:
   receive, from along the first electronic pathway, the electronic document together with a request for signature;
   access a list of the plurality of authorized signatories in a restricted database maintained by the first entity;
   determine the availability of an authorized signatory from the list of the plurality of authorized signatories, said determining being effected according to a predetermined protocol, the protocol comprising a ranking of authorized signatories defined by one or more predetermined metrics, wherein one of the predetermined metrics comprises a level of availability of the authorized signatories;
   when the authorized signatory is determined to be available, select the authorized signatory from the list of the plurality of authorized signatories;
   transmit the electronic document to the authorized signatory for affixing the electronic signature to the electronic document via the first electronic communication pathway; and
   upon notification of the affixing of the electronic signature to the electronic document, transmit the electronically signed electronic document to the second entity via the second electronic communication pathway.

2. The system of claim 1, wherein the electronic document comprises an electronic signature applied by a signatory to a location on each of the documents that corresponds to a predetermined field tab.

3. The system of claim 1, wherein the protocol comprises a ranking of authorized signatories defined by two or more predetermined metrics.

4. The system of claim 3, wherein the two or more of the predetermined metrics comprises the level of availability of the authorized signatories and the seniority of the authorized signatories.

5. The system of claim 1, wherein, when the protocol determines that a selected signatory is not available for electronic signature, the protocol requires signature by two or more authorized signatories on the electronic document.

* * * * *